Dec. 24, 1940.  W. E. MERRIMAN ET AL  2,226,175
OPERATING CONTROL FOR FILM HANDLING APPARATUS
Filed Nov. 26, 1938   2 Sheets-Sheet 1

WILLIAM E. MERRIMAN
CLARENCE W. CARROLL
INVENTORS

Dec. 24, 1940.  W. E. MERRIMAN ET AL  2,226,175
OPERATING CONTROL FOR FILM HANDLING APPARATUS
Filed Nov. 26, 1938  2 Sheets-Sheet 2
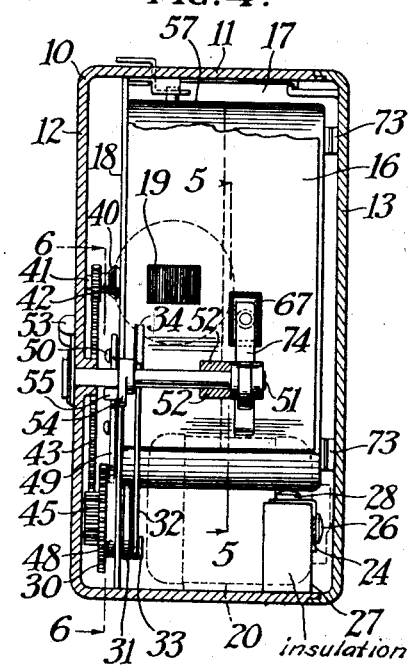
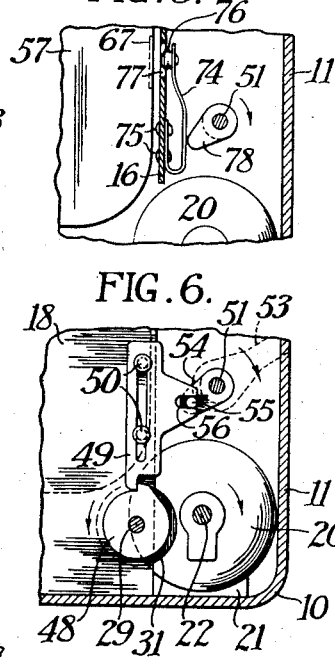
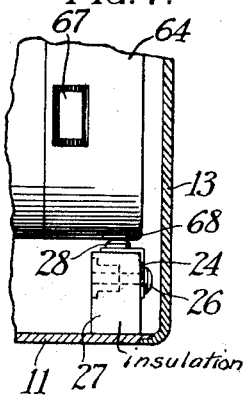
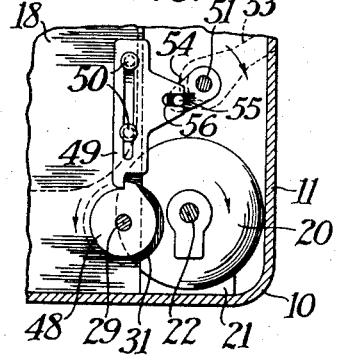
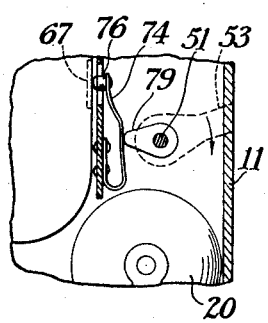
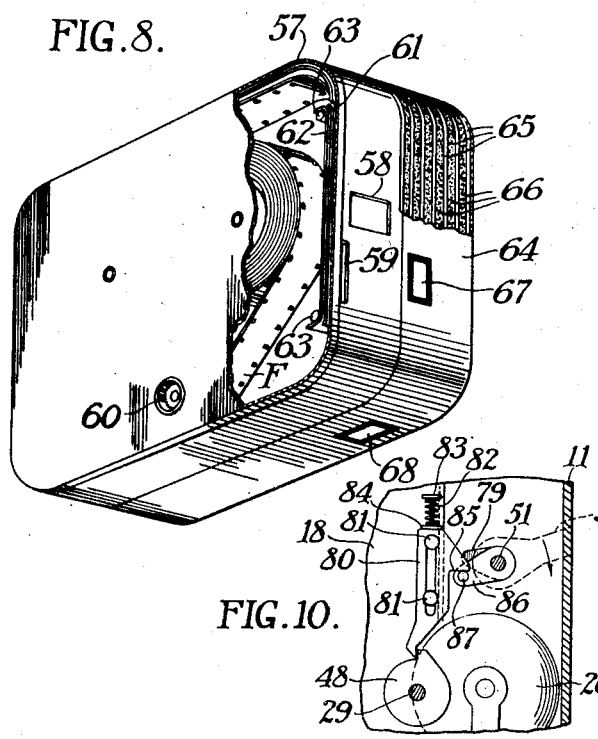
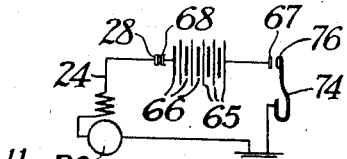
WILLIAM E. MERRIMAN
CLARENCE W. CARROLL
INVENTORS
BY
ATTORNEYS Patented Dec. 24, 1940

2,226,175

UNITED STATES PATENT OFFICE 2,226,175

OPERATING CONTROL FOR FILM HANDLING APPARATUS

William E. Merriman and Clarence W. Carroll, Rochester, N. Y., assignors to Eastman Kodak Company, Rochester, N. Y., a corporation of New Jersey Application November 26, 1938, Serial No. 242,524

2 Claims. (Cl. 88—17)

The present invention relates to a film handling apparatus and is a continuation-in-part of our pending application, Serial No. 142,869, filed May 15, 1937. Said prior application is directed to photographic apparatus of the magazine type and particularly to the provision of a film magazine containing a source of energy for operation of the apparatus, whereas, the present application is directed to control means for supervising the supply of energy to the motor for driving the film handling apparatus so that said apparatus can be efficiently controlled and stopped in a predetermined position.

Several types of prime movers, such as electric motors, air turbines, etc., have been used to drive film handling apparatus. However, the control of such prime movers has previously been accomplished merely by controlling the supply of energy thereto so that the film advancing mechanism or shutter member of the apparatus may stop in an undetermined position when the supply of energy to the motor has been shut off.

The primary object of the present invention is the provision in a film handling apparatus of an energy control means for supervising operation of the driving motor connected to the film moving means, of a release means for directly supervising the film moving means, and of a common operating control means which is operatively connected to said energy control means and to said release means and for moving the same to change the effective positions thereof.

Another object of the invention is the provision of a common operating control means which is operatively connected to an energy control means and to a release means for the film moving means, such operating control means being arranged to move the energy control means and release means in timed relation for sequential change of their effective positions.

A further object of the invention is the arrangement of said common operating control means, such that the energy control means is moved to an "off" position before the release means is moved to a "stop" position and vice versa.

A still further object of the invention is a converse arrangement of the common operating control means whereby the release means is moved to a "stop" position just prior to the energy control means being moved to an "off" position and vice versa.

Other objects of the invention will be apparent to those skilled in the art from the following description.

The above and other objects of the invention are attained in a film handling apparatus comprising in combination a driving motor which is adapted to be connected and operated by a supply of energy, an energy control means connected between said motor and its supply of energy, a film moving means, a release means movable into and out of engagement with said film moving means, and a common operating control means which is operatively connected to said energy control means and to said release means for moving both of them to change their effective positions. More specifically, the common operating control means may be arranged to operate the energy control means and the release means in either sequential order so that the energy control means is moved to "off" position before the release means is moved to "stop" position and the release means is moved to "run" position before the energy control means is moved to "on" position or such that the release means is moved to "stop" position just prior to movement of the energy control means to "off" position and the energy control means is moved to "on" position just prior to movement of the release means to "run" position.

Reference is hereby made to the accompanying drawings wherein similar reference characters designate similar elements and wherein:

Fig. 4 is a vertical section of the photographic apparatus taken on the line 4—4 of Fig. 2.

Fig. 5 is a partial section taken on the line 5—5 of Fig. 4.

Fig. 6 is also a partial section taken on the line 6—6 of Fig. 4.

Fig. 7 is a partial section taken on the line 7—7 of Fig. 3.

Fig. 8 is a perspective view of the combined film and energy magazine with portions of the casing broken away to illustrate the internal construction.

Figs. 9 and 10 are partial longitudinal sections similar to Figs. 5 and 6 and showing the arrangement of the controlling members for the alternative form of the invention.

Fig. 11 is a wiring diagram of the electric species of the invention.

Figure 1:
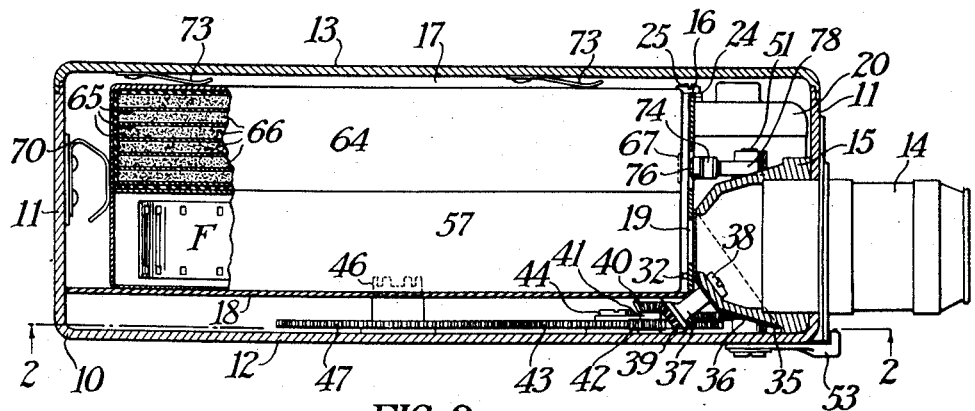
Fig. 1 is a transverse section through the photographic apparatus ilustrating the location of the film and energy magazine, a portion of the magazine being broken away to indicate the structure thereof.

While the present invention is illustrated as applied to a magazine type of photographic camera which is operated by an electric motor, it is understood that the invention in its scope contemplates any manner of photographic apparatus and any type of prime mover which may be operated by a source of energy either within or outside of said apparatus. For instance, a rocket type of prime mover and energy supply could be employed in the performance of the invention without departing from the scope thereof.

In the illustrated embodiment of the invention the camera casing 10 includes an edge wall 11, a side wall 12 and a cover 13 which fits onto the edge wall 11 in light-tight relation thereto. An objective 14 is mounted upon the front edge wall 11 of camera casing 10 and objective socket 15 is mounted within casing 10 behind objective 14. A front plate 16 is also mounted in the front of the camera and constitutes the front wall of the magazine chamber 17. A mechanism plate 18 extends longitudinally of casing 10 and constitutes the side wall of magazine chamber 17. Front plate 16 is provided with an exposure aperture 19 in alignment with objective 14.

Various film operating mechanisms are provided within the camera and include a film advancing mechanism and a shutter mechanism both operated by a prime mover. The prime mover may comprise an electric motor 20 mounted by a bracket 21 upon the lower portion of edge wall 11. The motor shaft 22 extends from one end of said motor 20 and carries a small spur gear 23. A connection 24 is attached at one end by a screw 25 to one side of motor 20 and at the other end by a screw 26 to an insulating post 27. Said other end of connection 24 includes a contact 28, the function of which will be later explained.

The film advancing mechanism is operated from a countershaft 29 which carries a gear 30 in mesh with the spur gear 23 on the motor shaft 22. Said film advancing mechanism comprises a driving disc 31 to which one end of film claw 32 is eccentrically pivoted by a crank pin 33. Front plate 16 is also provided with a claw slot 34 through which film claw 32 may extend in a known manner.

The shutter means may be provided in any conventional fashion but is here disclosed as a conical shutter member 35 provided with an opening 36 and pivotally mounted by a shutter shaft 37 and nut member 38 on the rear wall of objective socket 15. Shutter member 35 is driven from countershaft 29 through the following gear train: a bevel gear 39 on the other end of shutter shaft 37, a bevel gear 40 on a stub shaft 41 mounted upon side wall 12, a small gear 42 on stub shaft 41, a large gear 43 also rotatably mounted on side wall 12 by a bolt 44 and which meshes with a small spur gear 45 on countershaft 29.

The driving connection to the film magazine includes a clutch member 46 extending into magazine chamber 17, rotatably mounted in mechanism plate 18 and driven by a large gear 47 which meshes with said large gear 43.

The release means for the operating mechanisms of the apparatus are disclosed in Figs. 4, 5, 6, 9 and 10. The preferred form of the release mechanism is shown in Figs. 4, 5 and 6 and comprises a single-toothed cam 48 mounted upon countershaft 29, a blocking member 49 slidably mounted by pins 50 upon mechanism plate 18. Said release also includes a shaft 51 rotatably mounted in side wall 12 and in a bushing 52 of objective socket 15. An external finger member 53 is attached to one end of shaft 51. An arm 54 is intermediately attached to shaft 51 and carries a pin 55 engaging a slot 56 in blocking member 49. Upon operation of the external finger member 53 in the direction of the arrow in Fig. 6, blocking member 49 is raised so that the abutment thereon disengages the single-toothed cam 48 whereupon the film-advancing mechanism, shutter mechanism and drive to the magazine clutch member 46 may be operated by the prime mover or electric motor 20.

The film and energy magazine contains a film supply which may extend through the film compartment thereof in any desired path. Said magazine comprises a film casing 57 which is provided with an exposure aperture 58 and a claw slot 59 and which carries a rotatable clutch member 60 complementary to clutch member 48 and for engagement therewith. The film strip F is held across exposure aperture 58 by a pressure pad 61 resiliently held against exposure aperture 58 by a spring member 62 which is mounted upon studs 63. When the film and energy magazine is inserted into magazine chamber 17, the exposure aperture 58 is in alignment with exposure aperture 19 in front plate 16 and with objective 14. The passage of light through exposure apertures 19 and 58 is controlled by shutter member 35. The film claw 32 extends through claw slot 59 to engage the perforations along one margin of the film strip F within the magazine. The constructions and arrangements thus far described are quite conventional and well known.

The film and battery magazine also includes a battery casing 64 which contains the source of energy preferably in the form of laminated dry cell elements comprising alternate layers of zinc 65 and of electrolytic paste 66, both of known composition and properties. One group of layers 65 is connected in any suitable or well known manner to a contact 67 on the front casing 64, while the other group of layers 66 is connected in a similar manner to a contact 68 on the bottom of casing 64. Of course, it is understood that the location of contacts 67 and 68 may vary as the design of the photographic apparatus dictates.

Figure 2:
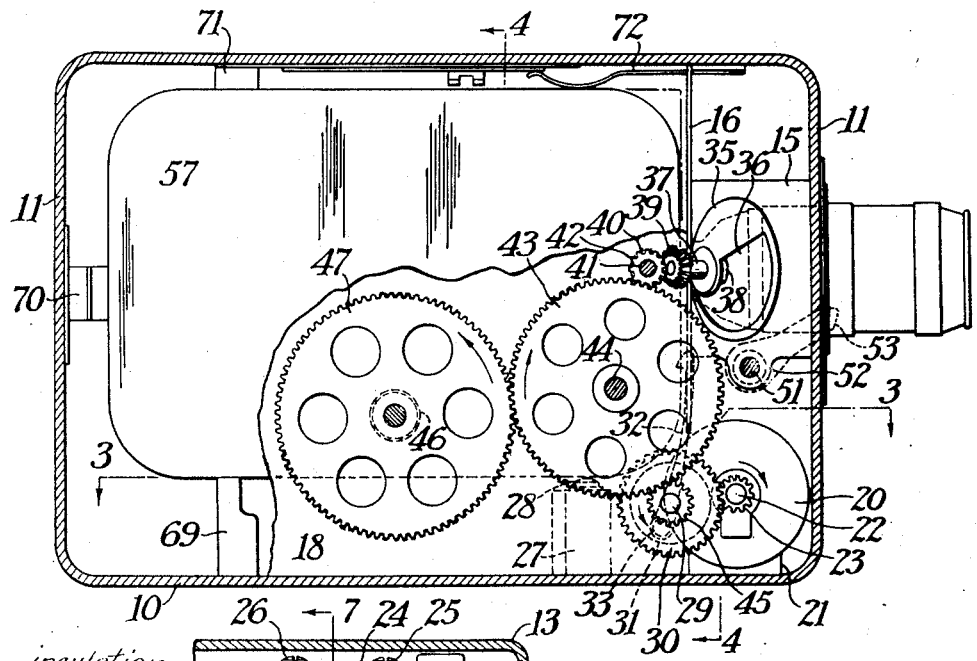
Fig. 2 is a partial section of the photographic apparatus taken on the line 2—2 of Fig. 1 and also a side elevation of the magazine and magazine chamber.
Figure 3:
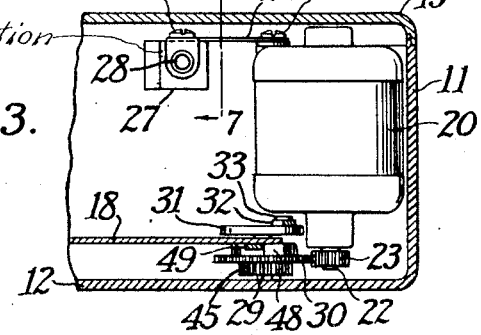
Fig. 3 is a partial section on the line 3—3 of Fig. 2 and shows a plan view of the prime mover and one of the combined connection and positioning members.

A support 69 extends from the lower edge wall 11 of camera casing 10 for supporting the lower edge of the film and battery magazine. A plurality of positioning members, such as springs 70, 71, 72, see Fig. 2, and 73, see Fig. 1, engage the sides of the film and battery magazine to hold it in position within the magazine chamber 17 with exposure aperture 58 and claw slot 59 in operative relation to the objective 14 and film claw 32, respectively. At the same time contact 68 in the lower wall of the film and battery magazine bears against the contact 28 on the end of connection 24 to establish an electric connection between one side of the electric dry cell battery and one side of motor 20. It is thus evident that contact 28 simultaneously functions to establish the aforementioned electric contact and to locate or position the film and battery magazine properly within magazine chamber 17.

The energy control means for the connection of the energy source to the prime mover may be provided in any desired manner but an advantageous arrangement of such a control is disclosed herein. A spring arm 74 is mounted by rivets 75 upon the front plate 16. A contact 76 is mounted on the end of arm 74 and may move through opening 77 in front plate 16 into engagement with the contact 67 on the front wall of the film and battery magazine. Spring arm 74 is mounted so that under normal conditions contact 76 is spaced from contact 67 and the connection between the source of energy and prime mover is normally interrupted.

The present invention is primarily directed to a common operating control means for operating the aforementioned release means and energy control means. The preferred form of such common operating control means is shown in Figs. 5 and 6 while an alternative or converse form of the common operating control means is shown in Figs. 9 and 10.

The preferred form of common operating control means comprises a cam arm 78 mounted upon the shaft 51. When said cam arm 78 is rotated in the direction of the arrow in Fig. 5, spring arm 74 is moved so that contact 76 engages contact 67 to complete the connection between the energy source and the prime mover. Cam arm 78 is relatively positioned or timed with respect to arm 54 and so that pin 55 raises the blocking member 49 for disengagement of the abutment on the blocking member and the single toothed cam 48 before contact 76 engages contact 67. By such a common operating control means it is insured that the operating mechanism of the film handling apparatus will be released for operation by the motor 20 before said motor 20 is energized by the source of energy, such as the dry battery.

The arrangement just described provides the advantage that the motor cannot be energized and endeavor to drive the various camera mechanisms before the mechanism release means has been operated to dis-engage or free the film advancing and shutter mechanisms. In other words, the release means is moved to disengaging or "run" position before the energy control means is moved from "off" to "on" position.

This same relative arrangement or sequential operation of the energy control means and release means insures that the release means will not be engaged before the prime mover or motor is de-energized. For example, before the finger member 53 is returned to blocking position, the cam arm 78 is moved to permit separation of contacts 67 and 76 for de-energization of the motor 20. However, before the motor and film moving mechanisms have dissipated the inertia of operation therein, the arm 54 will have moved blocking member 59 into engagement with the single toothed cam 48 to stop the film advancing and shutter mechanisms in a predetermined position. In terms of positions of the energy control means and release means, the energy control means is moved to "off" position before the release means is moved to "stop" position.

In order to avoid fogging of one or more frames of the film, it is necessary to stop the camera mechanisms in a definite position and with the shutter member 35 in closed position. Obviously, this desired result cannot be obtained by merely interrupting the contacts 67 and 76 and permitting the motor to coast to a stop. However, the arrangement proposed does not permit the release means or blocking mechanism to function until the motor has been de-energized and is already coasting to a stop.

The alternative form of the common operating control means is shown in Figs. 9 and 10 and comprises a cam arm 79 mounted on shaft 51 for operation by the finger member 53 and for engaging the spring arm 74 to move contact 76 against contact 67, all as shown in Fig. 9. The release means is shown in Fig. 10 and comprises as before a single toothed cam 48 mounted on counter-shaft 29 and a blocking member 80 slidably mounted by pins 81 upon mechanism plate 18 and normally urged into engaging or "stop" position by a spring 82 which is located between a lug 83 on mechanism plate 18 and a lug 84 on blocking member 80. Said blocking member 80 also includes a projection 85.

In this form of the invention the common operating control means includes a portion or arm 86 which is mounted on shaft 51 and which carries a pin 87 for engaging the projection 85 of blocking member 80.

The principal difference in this alternative arrangement of the common operating control means from that already shown is a different order of sequential operation of the energy control means and the release means. Cam arm 79 and arm 86 are both mounted upon shaft 51 but are in such angular relation to each other that arm 79 acts to close contacts 67 and 76 before the engaging end of blocking member 80 is moved out of engagement with the abutment on the single toothed cam 48. Such relative angular positioning of cam arm 79 and arm 80 is shown in Fig. 10.

The operation of this alternate form of the common operating control means is such that the energy control means is moved to "on" position just before the release means is moved to "run" position and the release means is moved to "stop" position just before the energy control means is moved to "off" position. Although this form of the invention has the disadvantage that the motor will be strained and the energy supply may be reduced somewhat more rapidly, such arrangement has the advantage that there will be no back lash in the gears or other mechanisms between the motor and the film operating mechanisms and consequently the advancement of the film by the motor and film moving mechanisms will be more immediate.

The circuit for the battery to the motor is shown diagrammatically in Fig. 11. One side of the battery, such as the zinc plates 65, is connected to the contact 67. The normally open contact 76 on spring arm 74 is connected to ground or to the front plate 16 and camera casing 10. The other side of the battery, such as the layers of electrolytic paste 66, is connected to the contact 68, through contact 28 and connection 24 to one side of the motor 20, the other side of the motor being grounded to complete the circuit or being connected to the camera casing 10 in a known manner.

The generic concept of the present invention is a common operating control means for sequential operation of an energy control means and a release means. The preferred form of sequential operation reduces the strain on the motor and the consumption of energy because the energy supply is shut off before the film moving mechanisms are stopped and the energy supply is not turned on until the release means has freed the film moving mechanisms. The other form of the invention is subject to the disadvantage of strain on the motor and drain on the energy supply but insures more immediate movement of the film because the motor is energized before the film moving mechanisms are free and is not de-energized until after the release means has stopped the film moving mechanisms.

Since other and further modifications of the invention are possible without departing from the scope thereof, the present disclosure is to be construed in an illustrative sense, the scope of the invention being defined in the appended claims.

Having now particularly described our invention what we desire to secure by Letters Patent of the United States and what we claim is:

1. In a film handling apparatus having a film gate, the combination with an operating mechanism including a film moving member for intermittently advancing a film strip through said gate and including a shutter member connected in timed relation to said film moving member and for covering said film gate during film advancement and uncovering the same for exposure of the film strip, an electric motor adapted to be connected to a supply of electrical energy and for driving said operating mechanism, a switch means connected between said motor and its energy supply and movable to an "on" position and to an "off" position, and a release means movable to a "run" position and movable into a "stop" position into engagement with said operating mechanism to stop the same with said shutter in its closed position, of a common operating control means operatively connected to said switch means and to said release means and arranged sequentially to move said switch means and said release means into and out of operative and inoperative positions.

2. In a film handling apparatus having a film gate, the combination with an operating mechanism including a film moving member for intermittently advancing a film strip through said gate and including a shutter member connected in timed relation to said film moving member and for covering said film gate during film advancement and uncovering the same for exposure of the film strip, an electric motor adapted to be connected to a supply of electrical energy and for driving said operating mechanism, a switch means connected between said motor and its energy supply and movable to an "on" position and to an "off" position, and a release means movable to a "run" position and movable into a "stop" position into engagement with said operating mechanism to stop the same with said shutter in its closed position, of a common operating control means operatively connected to said switch means and to said release means, for moving said release means from "run" to "stop" position to stop the operating mechanism with said shutter member in closed position, and for moving said switch means from "on" position into "off" position before said release means is moved to "stop" position.

WILLIAM E. MERRIMAN.
CLARENCE W. CARROLL.